United States Patent
Rey

(10) Patent No.: US 12,309,012 B2
(45) Date of Patent: May 20, 2025

(54) METHODS, DEVICES AND SYSTEMS FOR MODIFYING A POWER PROFILE OF A FREQUENCY DIVISION MULTIPLEXED SIGNALS

(71) Applicant: Cypress Semiconductor Corporation, San Jose, CA (US)

(72) Inventor: Claudio Rey, Chandler, AZ (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/075,115

(22) Filed: Dec. 5, 2022

(65) Prior Publication Data
US 2024/0187294 A1    Jun. 6, 2024

(51) Int. Cl.
*H04L 27/26* (2006.01)
*H04L 5/00* (2006.01)

(52) U.S. Cl.
CPC .......... *H04L 27/2628* (2013.01); *H04L 5/001* (2013.01)

(58) Field of Classification Search
CPC .. H04L 27/2614; H04L 27/2628; H04L 5/001
See application file for complete search history.

(56) References Cited

U.S. PATENT DOCUMENTS

| | | | | |
|---|---|---|---|---|
| 9,882,756 | B2* | 1/2018 | McCallister | H04L 27/2623 |
| 2004/0218689 | A1* | 11/2004 | Akhtman | H04L 27/2624 |
| | | | | 375/296 |
| 2010/0177847 | A1* | 7/2010 | Woodward | H04L 27/2614 |
| | | | | 375/296 |
| 2017/0134205 | A1* | 5/2017 | Kim | H04L 27/2623 |
| 2021/0298027 | A1* | 9/2021 | Haza | H04W 72/0446 |

* cited by examiner

*Primary Examiner* — David S Huang

(57) ABSTRACT

A method can include receiving a plurality of digital data symbols; encoding each data symbol into frequency domain values, the frequency domain values for each data symbol transmitted over a different frequency range; combining samples of multiple frequency domain values into a sequence of initial output values in time; generating a sequence of modification values that form a modification pulse, the modification pulse having a non-linear slope that decreases as it approaches a modification pulse maximum and increases as it departs from the modification pulse maximum; decreasing the initial output values according to the modification values to generate modified output values; and transmitting a wireless signal compatible with at least one IEEE wireless standard according to the modified output values. Corresponding devices and systems are also disclosed.

17 Claims, 10 Drawing Sheets

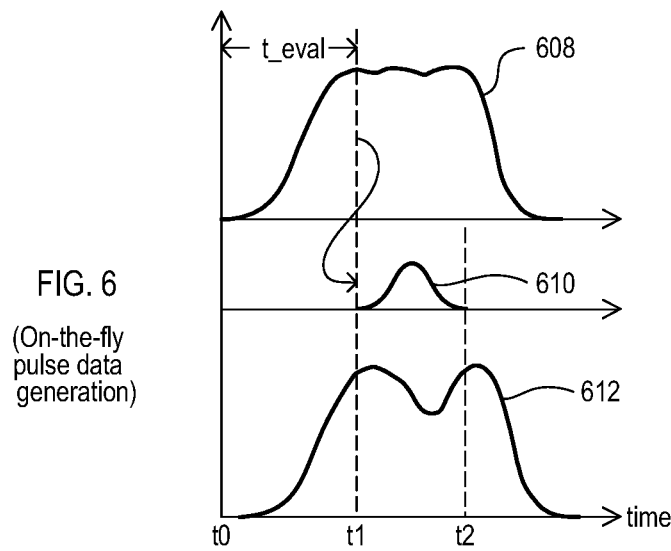
FIG. 6
(On-the-fly pulse data generation)
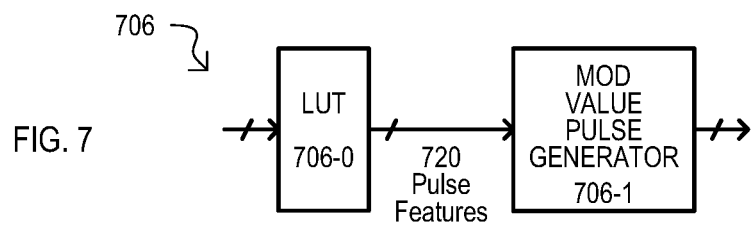
FIG. 7
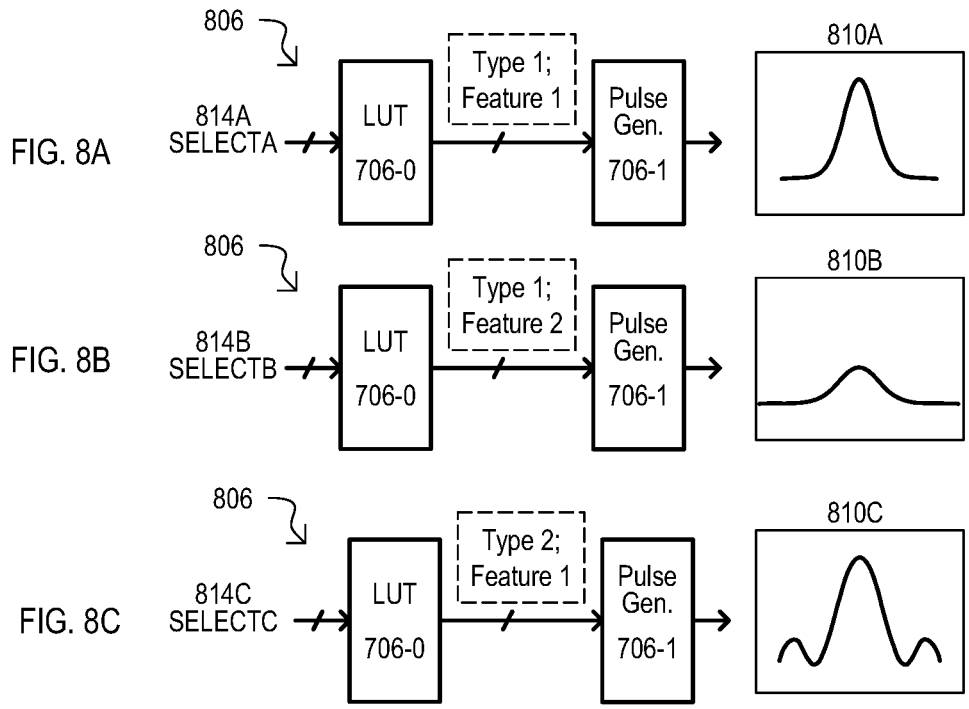
FIG. 8A
FIG. 8B
FIG. 8C

METHODS, DEVICES AND SYSTEMS FOR MODIFYING A POWER PROFILE OF A FREQUENCY DIVISION MULTIPLEXED SIGNALS

TECHNICAL FIELD

The present disclosure relates generally to wireless systems, and more particular to wireless modulation systems, including systems with frequency division modulations.

BACKGROUND

Orthogonal frequency division multiplexing (OFDM) enjoys wide use in wireless applications for its ability to provide relatively high data transmission rates over a relatively small bandwidth. OFDM achieves such capabilities with data divided into parallel streams (channels), one for each subcarrier, with subcarriers being transmitted simultaneously. However, such simultaneous transmission can lead to a high peak-to-average-power ratio (PAPR). PAPR is a peak amplitude squared divided by the root mean square (RMS) over a sampled period.

For conventional systems, such as OFDM systems, with high PAPR values, optimal performance can require high-resolution digital-to-analog converter (DAC) and a power amplifier (PA) with a wide linear region. Absent such, signals can have a high error vector magnitude (EVM), as well as in-band interference and/or out of band interference.

Conventional approaches to addressing high PAPR in transmitted signals can include clipping peak values and filtering. However, such approaches can fail to control the resulting high EVM signals.

It would be desirable to arrive at some way of reducing PAPR in systems like those that include OFDM modulation.

SUMMARY

Embodiments can include systems, devices and methods for modulating systems in which a resulting undesirable power profile (e.g., peak-to-average power ratio, PAPR) can be modified by selectively lowering power according to one or more modification pulses. Modification pulses can be selected to raise PAPR while at the same time have low spectral splatter and low effect on any resulting error vector (EV) values for the transmitted signals. In some embodiments, modification pulse features (e.g., peak value, shape, duration) can be generated based on a resulting output signal.

BRIEF DESCRIPTION OF THE DRAWINGS

FIG. 6 is a diagram showing the generation of modification pulse values on-the-fly in response to output values, according to an embodiment.

FIG. 7 is a diagram of a pulse modification circuit that can be included in embodiments.

FIGS. 8A to 8C are diagrams showing the generation of various pulse types and features according to embodiments.

DETAILED DESCRIPTION

Embodiments can include wireless systems that transmit samples of data streams in parallel and correct for an undesirable power profile when such data streams are transmitted. Such a correction can include reducing transmission power according to modifying pulse values. Modifying pulse values can follow the shape of a modifying pulse, which can be selected to minimize spectral impact on the transmitted signals.

In some embodiments, a modifying pulse having a non-linear slope of one direction (e.g., positive slope) that initially increases over time, decreases as it approaches a maximum (or minimum). Then increases in an opposing direction (e.g., negative slope). In some embodiments, a modifying pulse can have a Gaussian-like shape, including but not limited to a Gaussian pulse, $sech^2$ pulse or a time bounded sinc pulse. As such, a shape of a modifying pulse can be selected to reduce spectrum "splatter". In some embodiments, modifying pulse values can be digital values corresponding to a modifying pulse shape.

In some embodiments, a scaled modifying pulse (e.g., a Gaussian pulse of selected height) can be subtracted from output values to reduce the resulting peak while causing a small quantifiable addition to the error vector magnitude (EVM) of the resulting signal, as compared to an unmodified transmission. The shaped of a modifying pulse can be scaled proportionally to the IQ value at the peak (e.g., ¼ of the IQ value or the peak) and can be of opposite polarity. The modifying pulse can be designed to conform to the spectral requirements of a system, and selected to not cause spectral splatter.

In some embodiments, peak values resulting from two adjacent transmitted values can be determined. From such values, a scaled shaped pulse of a matching width can be determined (e.g., a Gaussian pulse of the right bandwidth time produce, BT). Pulse features values (e.g., BT) can be computed through a look-up table to find corresponding width and timing that will best cancel the peak. According to embodiments, a height of the shaped pulse can be scaled proportionally to the IQ value of the peak to a degree that creates acceptable EVM. Also, as noted herein, the shape is designed not to cause spectral splatter.

Figure 1:
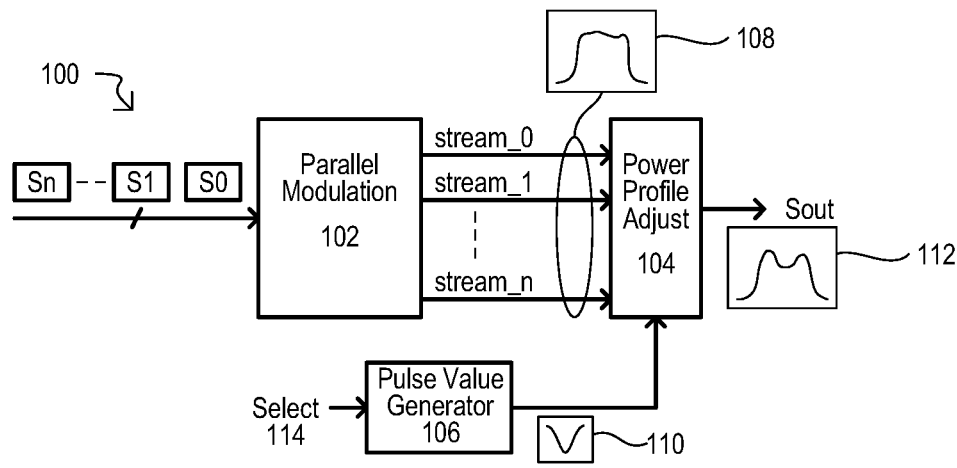
FIG. 1 is a block diagram of a system according to an embodiment.

In some embodiments, superimposed modifying pulses can be used to approximate a peak. Such superimposition can be obtained through a lookup table so as to best cancel the peak and the alternate samples. The height of the shaped pulse can again be scaled proportionally to the IQ value of the peak to a degree that creates acceptable EVM. Also, the shape can be designed not to cause spectral splatter FIG. 1 is as block diagram of a system 100 according to an embodiment. A system 100 can include a parallel modulation circuit 102, power profile adjust circuit 104 and pulse generator circuit 106. A parallel modulation circuit 102 can receive digital values (S0 to Sn) and from such values generate parallel streams (stream_0 to stream_n) of modulated values. Such parallel streams (stream_0 to n) can be sampled to generate one or more output signals for transmission. Embodiments can include a single input/single output (SISO) system in which samples of each stream can be combined for transmission, or a multiple input/multiple output (MIMO) system in which multiple streams can be transmitted separately. Parallel modulation circuit 102 can modulate data symbols according to any suitable transmission modulation method, including but not limited to: different carrier frequency (e.g., frequency division multiplexing, FDM, including orthogonal FDM, OFDM) and different coding streams (e.g., code division multiple access, CDMA).

Parallel streams (stream_0 to n), if transmitted without modification, can present an initial power profile 108 over a sample time period. In some embodiments, an initial power profile 108 can be undesirable, having a high peak-to-average power ratio (PAPR) or crest factor. A power profile adjusting circuit 104 can reduce the power profile over the sample period according to modifying pulse values 110 to generate modified output signal(s) Sout, which can have a more desirable modified power profile 112.

A pulse value generator circuit 106 can generate modifying pulse values 110 in response to a select input 114. In some embodiments, modifying pulse values 110 can vary as the initial power profile 108 varies. This can include generating no modifying pulse values (or modifying pulse values of zero) when an initial power profile 108 is considered acceptable. According to embodiments, selection/generation of modifying pulse values 110 can be in response to input values at any suitable location in the encoding/modulation path, including but not limited to: initial data values (e.g., bytes) corresponding to parallel streams, digitally encoded data values (e.g., symbols) corresponding to parallel streams or the parallel data streams themselves. Modifying pulse values 110 can be a stream of digital values or an analog signal.

In this way, a system that transmits multiple data streams in parallel can apply a power reducing corrective pulse, to address transmission periods that present an undesirable power profile.

Figure 2:
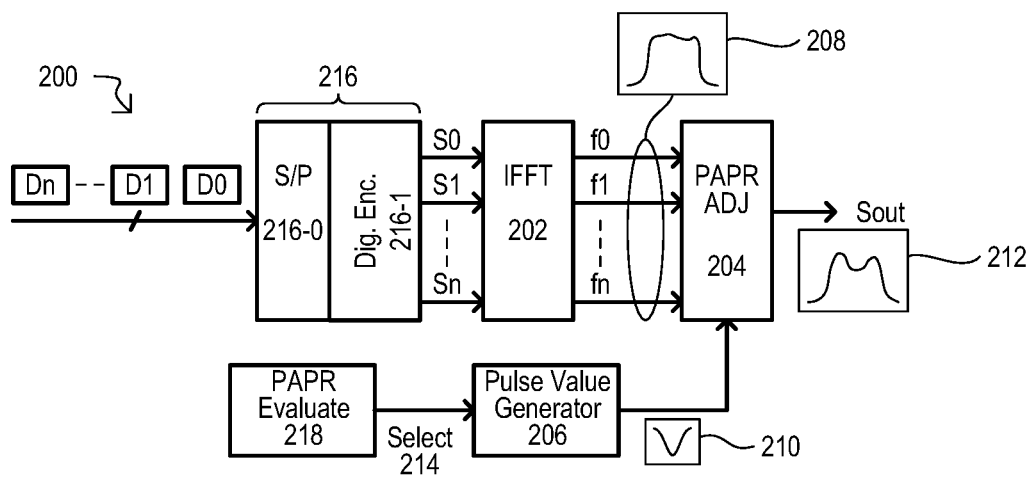
FIG. 2 is a block diagram of a system according to another embodiment.

FIG. 2 is a block diagram of a system 200 according to another embodiment. In some embodiments, a system 200 can be one implementation of that shown in FIG. 1. A system 200 can include digital encoding circuits 216, inverse fast Fourier transform (IFFT) circuits 202, PAPR adjust circuits 204, pulse value generator circuit 206 and PAPR evaluate circuit 218. Digital encoding circuits 216 can receive digital values (e.g., bytes) (D0 to Dn) and output parallel digital symbols corresponding to such data values. Digital encoding circuits 216 can include a serial-to-parallel (S/P) circuit 216-0 which can receive digital values (D0 to Dn) and provide them in parallel digital encoding circuits 216-1. Digital encoding circuits 216 can encode digital values (D0 to Dn) in parallel streams of digital symbols (S0 to Sn) that present bit values more suitable for transmission. Such encoding can take any suitable form, including but not limited to: 4/5 bit encoding, 8/10 bit encoding and "scrambling".

IFFT circuits 202 can convert symbol bit streams (S0 to Sn) into frequency domain values (f0 to fn). Such an operation can include any suitable encoding, including but not limited to phase shift keying PSK (including quadrature PSK) and frequency shift keying. In some embodiments, such frequency domain values (f0 to fn) can be on different carrier frequencies for FDM, including orthogonal carrier frequencies for OFDM. Frequency domain values (f0 to fn), absent any modification, can have transmission periods in which a PAPR 208 exceeds a predetermined limit.

PAPR evaluate circuit 218 can determine a PAPR, and optionally other values, for a sample period of the frequency domain values (f0 to fn). Such other values can include, but are not limited to a peak power value, crest factor and when in the sample period a PAPR is out of a desired range (e.g., too low). In response to such an evaluation, PAPR evaluate circuit 218 can generate select signals 214.

In response to different select signals 214, pulse value generator 206 can provide different modifying pulse values 210. Variation in modifying pulse values 210 can include, but is not limited to: bandwidth time product (BT), peak amplitude and/or duration (e.g., full-width-at-half-maximum, FWHM). In some embodiments, select signals 214 can be selected from among various different stored pulse values. In some embodiments, select signals 214 can be inputs to circuits that generate resulting pulse values, such as a look-up table (LUT), as but one example.

In this way, a FDM system can generate corrective pulse values tailored to an expected transmission period having a PAPR outside of a predetermined limit. Corrective pulse values can reduce a transmission power over an actual transmission period to create a more favorable PAPR.

Figure 3A:
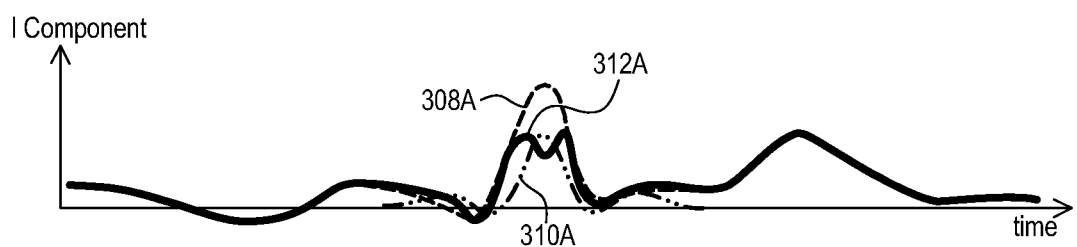
FIGS. 3A to 3C are diagram showing the modification of output values in response to one or more modification pulses.

FIG. 3A is a diagram showing output power profile modification according to an embodiment. FIG. 3A is a graph showing in-phase (I) components over time. Included is an initial (i.e., unmodified) waveform for an output signal 308A, a modifying pulse waveform 310A and a waveform for a modified output signal 312A. A modified waveform 312A can be a modifying pulse waveform 310A subtracted from an initial waveform 308A.

Figure 3B:
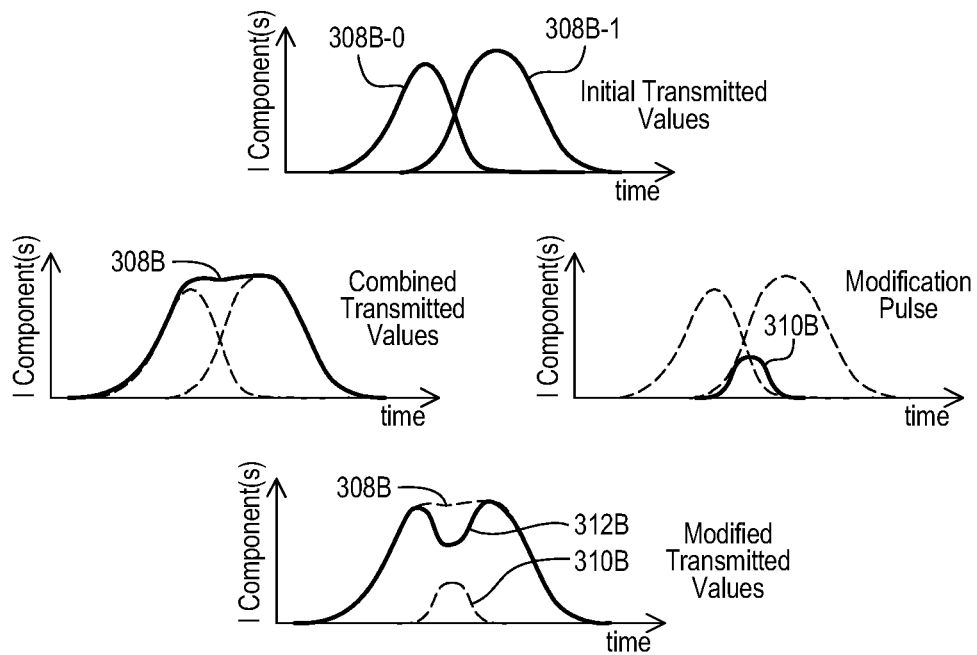

FIG. 3B are diagrams showing output power profile modification according to another embodiment. FIG. 3B shows magnitudes for two initial values 308B-0/1. Such initials values can correspond to signals (e.g., samples of parallel streams) transmitted over time. However, in other embodiments such initial values can be values for different streams transmitted in parallel. When combined, initial values can present a combined waveform 308B that can have an undesirable power profile.

From initial values 308B-0/1, a modification pulse 310B can be derived. This can include generating a modification pulse having a peak value and width that varies in response to those of the initial values 308B-0/1. In some embodiments, generation of a modification pulse can include selecting a peak value that is some portion (e.g., ¼) of initial the values 308B-0/1, as well as a width that is equal to, or some portion of the initial values. In some embodiments, a shape of modification pulse 310B can be selected based on features of initial values 308B-0/1.

A modified output pulse 312B can be generated by subtracting modification pulse 310B values from initial values 308B-0/1.

Figure 3C:
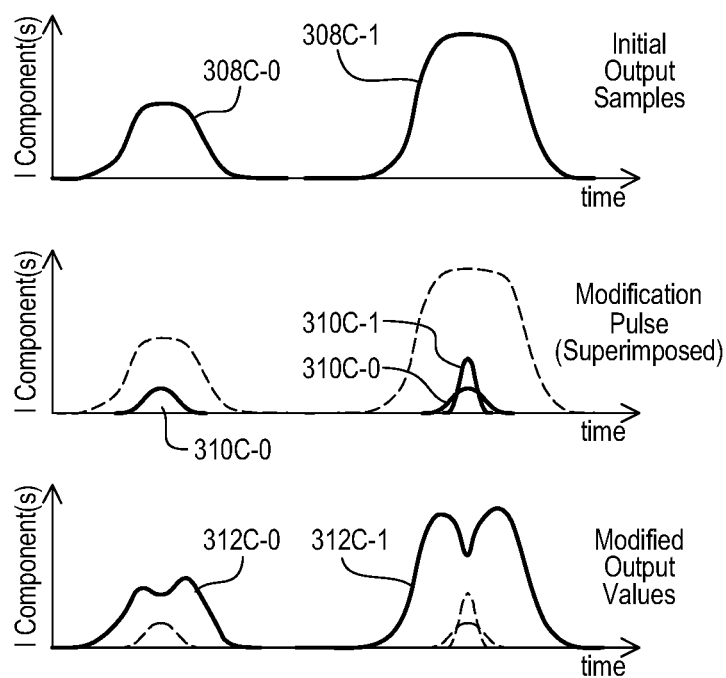

FIG. 3C are diagrams showing output power profile modification according to a further embodiment. FIG. 3C shows magnitudes for two initial values 308C-0/1 that can follow one another in time. Such initial values can correspond to transmitted samples of parallel modulated streams. Initial values 308C-0/1 can have undesirable power profiles (e.g., low PAPR).

According to embodiments, some initial values (e.g., 308C-0) can be modified with a modification pulse (310-C-0) as described herein. However, other initial values (e.g., 308C-1) can be modified by the superposition of two or more modification pulses. Such an operation is shown in FIG. 3C, where initial pulse 308C-1 is modified by superimposed modification pulses 310C-0/1 to provide modified output pulse 312C-1.

In this way, output values can be modified by one or more pulses generated in response to features of the output values.

Figure 4A:
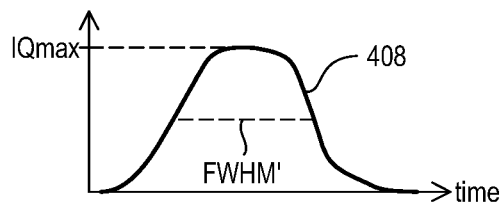
FIGS. 4A to 4C are diagrams showing how modification pulses can be generated in response to an output value according to an embodiment.
Figure 4B:
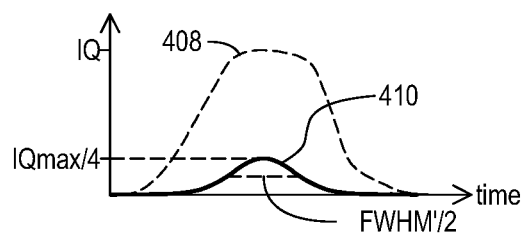
Figure 4C:
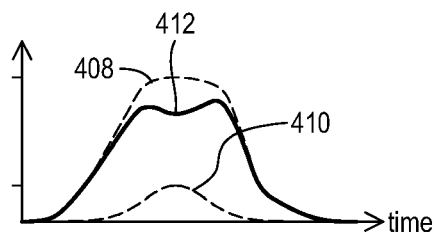

FIGS. 4A to 4C are diagrams showing an example of the generation of a modification pulse according to an embodiment. FIG. 4A shows an initial output pulse 408 in terms of IQ maximum over time. An initial output pulse 408 can have features that are used to select/generate a modification pulse. FIG. 4A shows a maximum IQ value (IQmax) as well as an estimated FWHM (FWHM'). FIG. 4B shows how a selected/generated modification pulse 410 can compare to a corresponding initial output pulse 408. In the embodiment shown, a modification pulse 410 can be a Gaussian pulse having maximum IQ value that is one-fourth that of the initial output pulse 408 and a FWHM that is one-half that of the initial output pulse 408. However, pulse type and features could take any suitable form, so the embodiments described herein should not be construed as limiting. FIG. 4C shows a modified output pulse 412 generated by subtracting the modification pulse 410 from the initial output pulse 406.

Figure 5A:
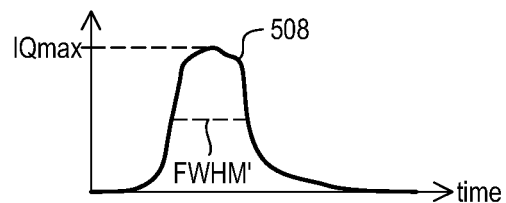
FIGS. 5A to 5C are diagrams showing how modification pulses can be generated in response to an output value according to another embodiment.
Figure 5B:
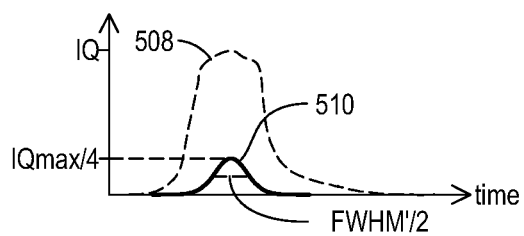
Figure 5C:
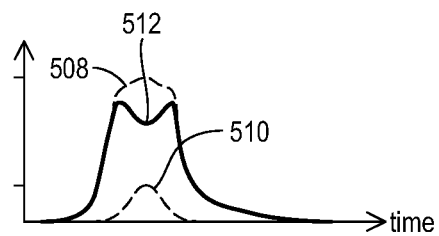

FIGS. 5A to 5C show another example of the generation of a modified output pulse 512 from an initial output pulse 508 and modification pulse 510. Again, the particular features used to generate the modification pulse (e.g., IQmax, FWHM) should not be construed as limiting. Embodiments can use any suitable method according to the anticipated output power profile.

In this way, a modification pulse used to lower a power profile of a sampled output period, and have an amplitude that is less than one-half a maximum power level of the output period, and a duration that is less than the sampled output period.

In some embodiments, modification pulse values can be generated in response to output values on-the-fly. Such an embodiment is shown in FIG. 6. FIG. 6 is a timing diagram showing initial output values 608, resulting modification pulse values 610 generated on-the-fly, and resulting modified output values 612.

Within an initial time period t0 to t1, initial output values can be evaluated to determine if the power profile appears undesirable (e.g., a rate of initial output values has slowed, and remained in a narrow range). If such initial output values are determined to be undesirable (e.g., PAPR to low), a modification pulse 610 can be generated. Such a modification pulse can be generated in any suitable method, including those described herein, and equivalents.

Initial output values 608 can be modified according to the generated modification pulse values 610 to produce a modified output value 612, which can be used to generate a transmitted signal.

In this way, output values can be modified on-the-fly to address undesirable output power profiles.

FIG. 7 is a block diagram of a pulse modification circuit 706 according to an embodiment. A pulse modification circuit 706 can include a look-up table (LUT) 706-0 and pulse value generator 706-1. A LUT 706-0 can generate pulse features 720 in response to select input values 714. Pulse value generator 706-1 can output pulse values that vary according to pulse features 720. Variations in output pulse values can include, but is not limited to: pulse type, pulse height and BT. A LUT 706-0 can output one set of pulse features 720, or a sequence of pulse features. Likewise, modification pulse values output from pulse value generator 706-1 can be one set of values, or a sequence of values sets over time.

FIGS. 8A to 8C are diagrams showing how a pulse modification circuit of FIG. 7 can generate different modification pulse values in response to different pulse feature data. FIG. 8A shows select values 814A that result in a modification pulse of one type 810A (e.g., Gaussian) and having a certain feature (e.g., duration, amplitude). FIG. 8B shows select values 814B that result in a modification pulse 810B of the same type as FIG. 8A, but with a different feature (e.g., smaller amplitude). FIG. 8C shows select values 814C that result in a modification pulse 810C of a different type from FIG. 8A (e.g., time bounded sinc) but with a same feature (e.g., amplitude). Of course, embodiments can include various other pulse types and features as described herein or equivalents.

In this way, a LUT or equivalent circuit can be used to generate modification pulse values.

Figure 9A:
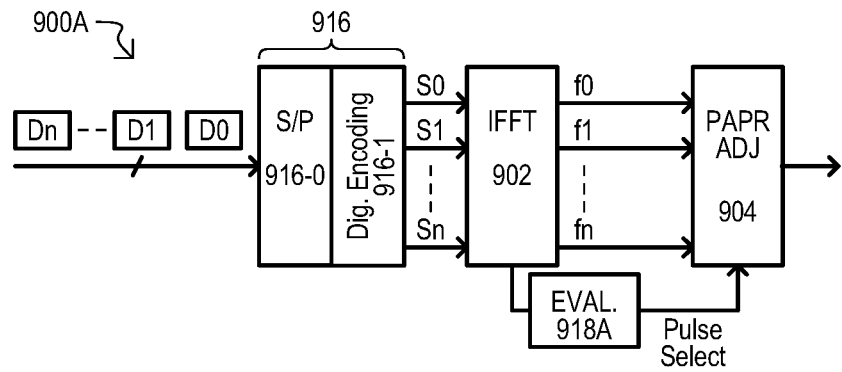
FIGS. 9A to 9C are block diagrams of systems showing how power profile correction can be based on various locations of modulation streams according to an embodiment.
Figure 9B:
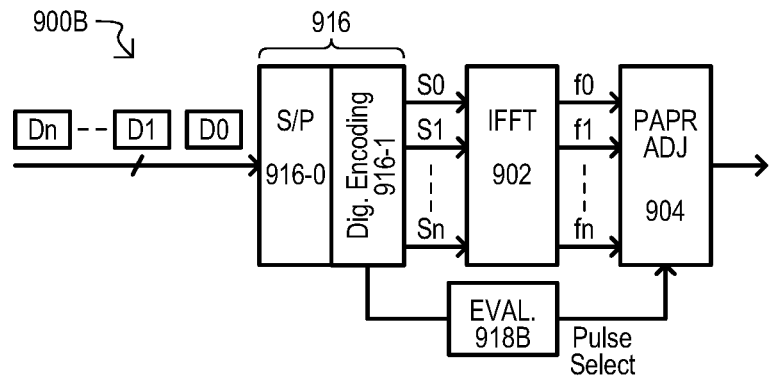
Figure 9C:
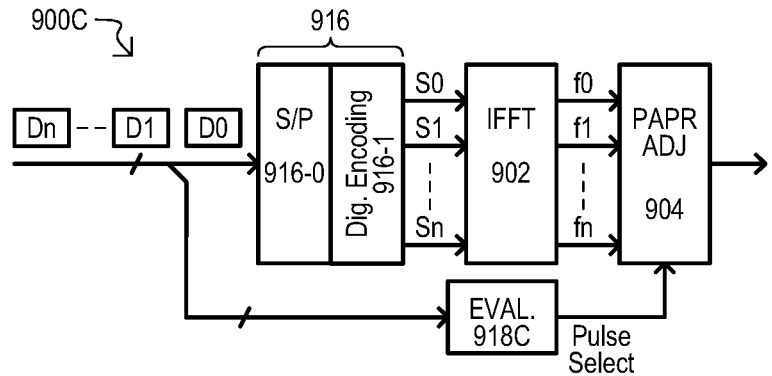

According to embodiments, the output power profile of a transmitted signal can be modified in response to an expected output power profile (e.g., a power profile with a PAPR outside of predetermined limits). An expected output power profile can be evaluated by evaluation circuits to determine how or if a modification pulse is applied to output values to improve an output power profile. FIGS. 9A to 9C are diagrams of systems showing evaluation circuits of various configurations.

FIG. 9A shows a system 900A having circuits like those of FIG. 2, including digital encoding circuits 916, stream (e.g., IFFT) encoding circuits 902, PAPR adjust circuits 904 and evaluation circuits 918A. Evaluation circuits 918A can provide pulse select data to PAPR circuits 904, which can control which modification pulse values are generated and/or whether such values are generated. Evaluation circuits 918A can generate pulse select values in response to outputs of stream encoding circuits 902. In some embodiments, evaluation circuits 918A can receive sample values for all encoded streams (e.g., consecutive summations of f0 to fn). In other embodiments, separate stream values can be received and evaluated.

FIG. 9B shows a system 900B like that of FIG. 9A, however evaluation circuits 918B can generate pulse select values based on digitally encoded values (e.g., symbols).

FIG. 9C shows a system 9000 like that of FIG. 9A, however evaluation circuits 918C can generate pulse select values based on digital values for transmission.

In this way, modification pulses that alter a power profile can be generated in response to values at any of various locations in the encoding/modulation path. It is understood that FIGS. 9A to 9C are provided by way of example, and so should not be construed as limiting.

Figure 10:
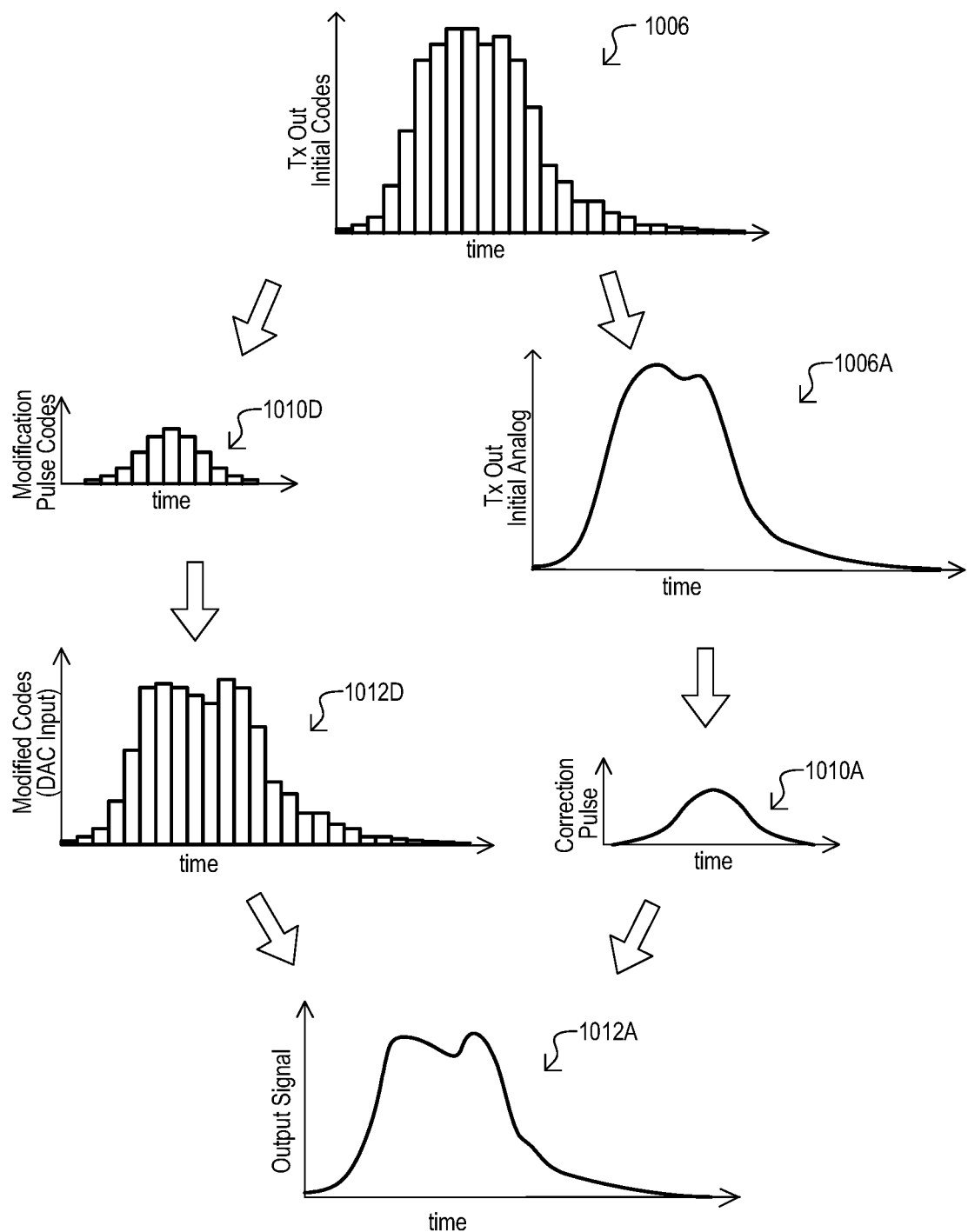
FIG. 10 are diagrams showing how output power profiles can be modified in digital or analog form, according to embodiments.

According to embodiments generation of pulse modification values can include digital arithmetic/logic operations and/or analog operations. Such variations in operations according to embodiments are shown in FIG. 10. FIG. 10 shows initial code values 1006, which are represented by resulting magnitudes over time in the diagram. Such values can be digital samples of multiple data streams (e.g., carrier frequency values) over time.

In some embodiments, digital codes for a modification pulse 1010D can be generated according to embodiments described herein (e.g., pulse type and features varying in response to initial code values 1006). Arithmetic/logic operations can then be performed with initial codes 1006 and modification pulse codes 1010D to generate a set of modified codes 1012D. Modified codes 1012D can be applied to a digital-to-analog converter (DAC) to generate a modified analog output signal 1012A.

In some embodiments, initial code values 1006 can be converted into an initial analog signal 1006A. Modification pulse values, in either digital form 1010D or analog form 1010A, can be used to modify initial analog signal 1006A to generate modified analog output signal 1012A.

In this way, any of an initial output signal, modifying pulse and modified output signal can be processed in digital or analog form.

Figure 11:
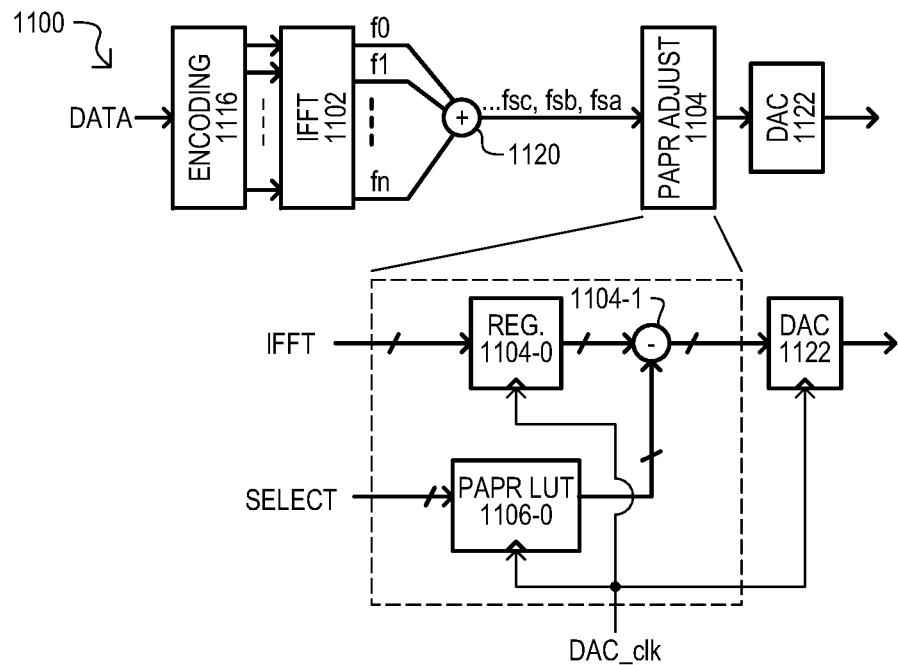
FIG. 11 is a block diagram of a system that modifies digital output values with modification pulse values, according to an embodiment.

FIG. 11 is a block diagram of a system 1100 according to another embodiment. A system 1100 can modify a sequence of initial digital values with a corresponding sequence of digital pulse modification values. A system 1100 can include encoding circuits 1116, parallel modulation (e.g., IFFT) circuits 1102, sample adder 1120, PAPR adjust circuits 1104 and a DAC 1122. Modulated parallel data streams can be sampled together at adder 1120 to generate a stream of sample values (fsa, fsb, fsc . . . ). Sample values (fsa, fsb, fsc . . . ) can be provided to PAPR adjust circuits 1104.

PAPR adjust circuits 1104 can include a register circuit 1104-0, PAPR LUT 1106-0, and arithmetic/logic (ALU) circuits 1104-1. A PAPR LUT 1106-0 can be configured by SELECT values to output a desired sequence of modification pulse codes. In some embodiments, SELECT values can be generated in response to an evaluation circuit as described herein or equivalents. A register circuit 1104-0 can receive sample values (fsa, fsb, fsc . . . ) and output them to ALU (e.g., subtract) circuits 1104. A register circuit 1104-0 can include FIFO structures or the like that store multiple values. In synchronism with a timing clock DAC_clk, ALU circuits 1104 can subtract modification pulse values from PAPR LUT 1106-0 from sample values (fsa, fsb, fsc . . . ) to generate modified output codes to DAC 1122. DAC 1122 can generate an analog output signal in response.

In this way, initial digital values of combined modulated parallel streams can be modified with stored modification pulse values to generate digital modified output values having a better power profile.

Figure 12:
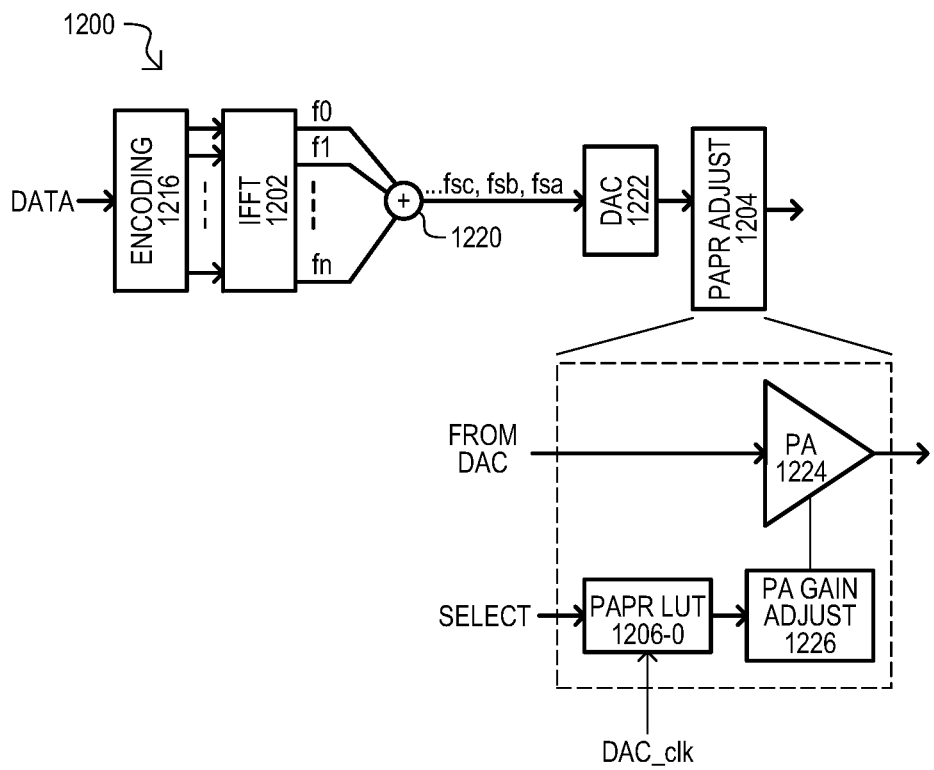
FIG. 12 is a block diagram of a system that modifies analog output signals with modification pulse values, according to an embodiment.

FIG. 12 is a block diagram of a system 1200 according to another embodiment. A system 1200 can modify an initial analog output pulse with a pulse modification values to provide a modified output power profile. A system 1200 can include encoding circuits 1216, parallel modulation circuits 1202, sample adder 1220, PAPR adjust circuits 1204 and a DAC 1222. Modulated parallel data streams can be sampled together at adder 1220 as described for FIG. 11. However, rather than be adjusted in digital form, such values can be applied to DAC 1222.

PAPR adjust circuits 1204 can receive an output of DAC 1222 and can include an adjustable gain power amplifier (PA) 1224, PAPR LUT 1206-0 and gain adjust circuit 1226. A PA 1224 can amplify an initial output signal from DAC 1222 according to a gain value. PAPR LUT 1206-0 can be configured by SELECT values to output a desired sequence of modification pulse codes, as described herein and equivalents. Gain adjust circuits 1226 can vary the gain of PA 1224 in response to modification pulse values output from PAPR LUT 1206-0. Such adjustment can modify an output signal with a low PAPR as described herein and equivalents.

In this way, an initial analog output signal can be modified with stored modification pulse values, to generate a modified output signal having a better power profile.

Figure 13A:
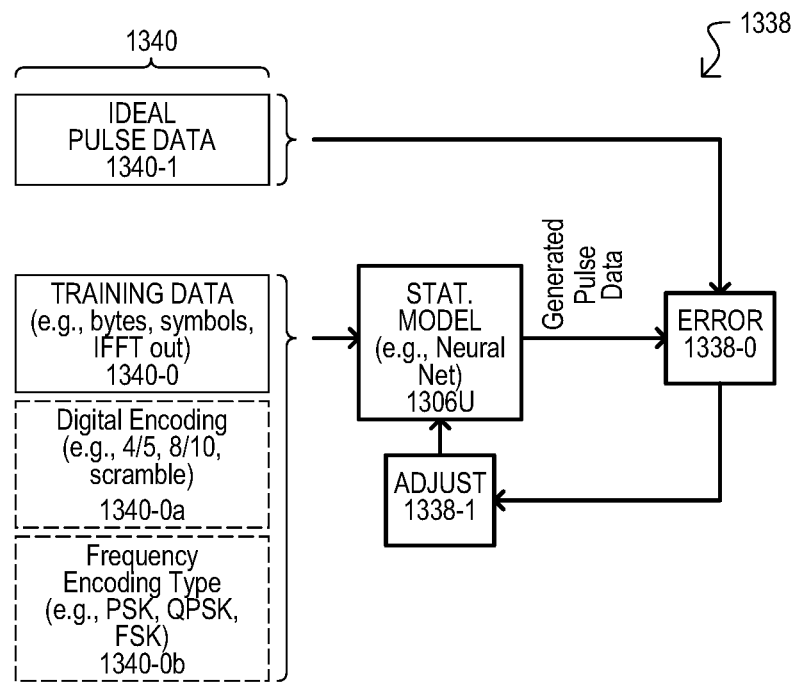
FIGS. 13A and 13B are diagrams showing a machine learned modification pulse generator that can be included in embodiments.
Figure 13B:
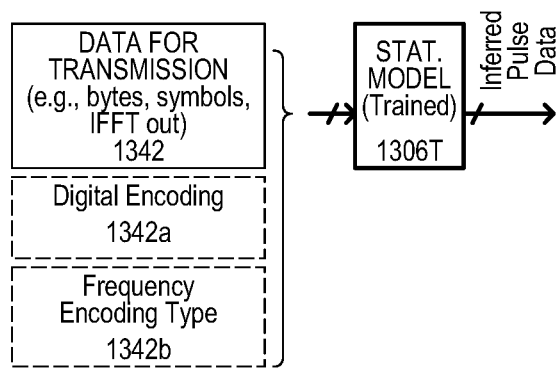

While embodiments can include storage circuits (e.g., LUTs) that store modification pulse data, alternate embodiments can include circuits that generate such values, such as a machine learned statistical model. FIGS. 13A and 13B show such an embodiment.

FIG. 13A shows a training of a statistical model according to an embodiment. Training data sets 1340 can include input training data 1340-0 corresponding to values used to generate parallel modulated data streams and output data 1340-1 corresponding to an ideal modification pulse for samples for the resulting output values. Input training data 1340-0 can include, but is not limited to, data input for transmission (e.g., bytes), digitally encoded data (e.g., symbols) or modulation values (e.g., IFFT results). In some embodiments, where system may employ different digital encoding methods, training data can include a digital encoding type 1340-0a. Similarly, in some embodiments, where system may employ different modulation methods, training data can include a modulation type 1340-0b. Output data 1340-1 can be a pulse shape that best addresses an undesirable output power profile, as described herein and equivalents.

In response to training input data 1340, an untrained statistical model 1306U can generate pulse data values. Such generated pulse data values can be compared to training output values 1340-1 by an error function 1338-0. Error values from error function 1338-0 can be provided to an adjust circuit 1338-1 which can adjust statistical model 1306U to reduce error (e.g., back propagation of error). Such training can occur in product development, with a resulting trained statistical models to be employed in a device to generate modification pulse values as described herein.

FIG. 13B shows a trained statistical model 1306T, for example, a statistical model after it has been trained as in FIG. 13A. Data (1342, optionally 1342a/b) corresponding to input training data can be applied to infer pulse data values, which can be used, as described herein and equivalents, to modify initial output values to have a power profile that does not suffer from a high PAPR.

In this way, machine learning structures can be used to generate modification pulse values to address a high PAPR in an output signal.

While embodiments can include single-input single-output (SISO) systems, like those shown in FIGS. 11 and 12, embodiments can also include multiple-input multiple-output (MIMO) systems.

Figure 14:
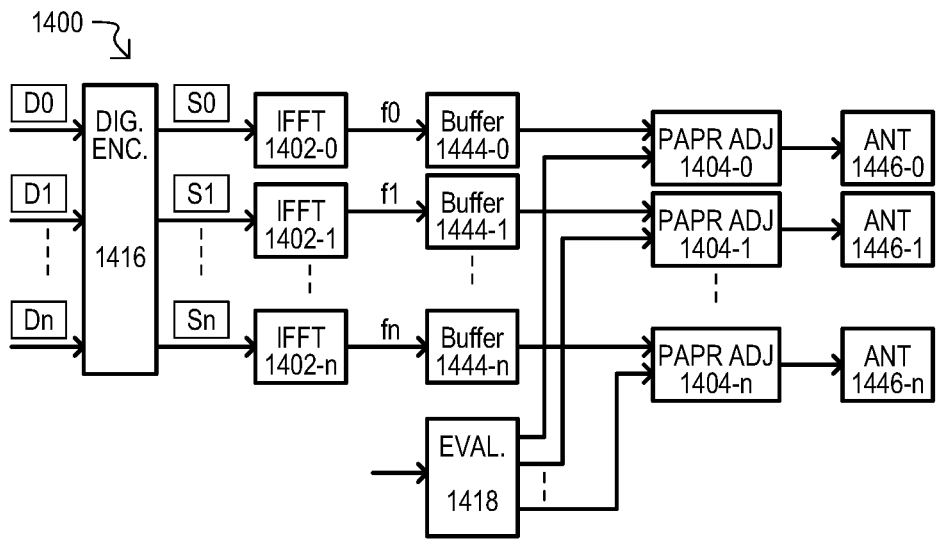
FIG. 14 is a block diagram of a multiple-input-multiple output system according to an embodiment.

FIG. 14 is a block diagram of a MIMO system 1400 according to an embodiment. A system 1400 can include items described herein, including digital encoding circuits 1416, parallel modulation circuits 1402-0 to -n, buffer circuits 1444-0 to -n and evaluation circuit 1418. However, a system 1400 can include a separate PAPR adjust circuit 1404-0 to -n and separate antenna 14460- to -n for each parallel modulated data stream.

Evaluation circuit 1418 can determine if an initial power profile does not meet desired criteria (e.g., has too low a PAPR). In response, evaluation circuit 1418 can provide select data to each PAPR adjust circuit (1404-0 to -n), which can selectively modify its sequence of modulated values or the analog signal resulting from such modulated values, as described herein or an equivalent. In some embodiments buffer circuits (1444-0 to -n) can buffer modulated data streams (f0 to fn) for the time required for evaluation circuit 1418 to make a determination of whether modification pulse values are to be generated, and if so, what features the modification pulses will have.

In this way, a power profile for a MIMO system can be adjusted by applying modification pulse values to one or more parallel modulation streams.

Figure 15A:
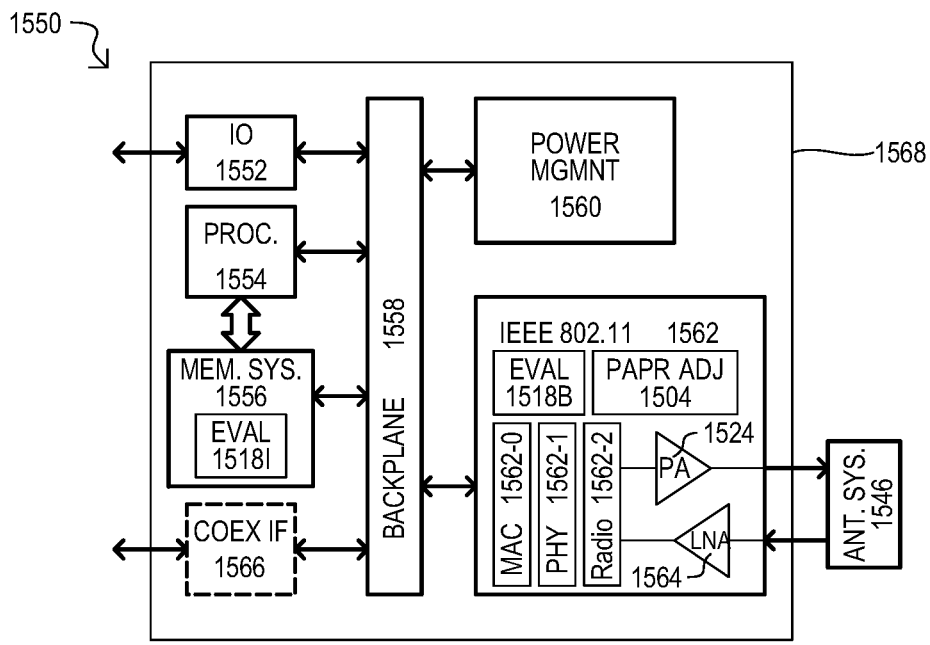
FIGS. 15A and 15B are diagrams showing integrated circuit devices according to embodiments.

While embodiments can include systems with separate components, some embodiments can be advantageously compact integrated circuit devices with circuits on board that can adjust a power profile of a transmitted signal. FIG. 15A shows a device 1550 according to an embodiment. A device 1550 can include IO circuits 1552, processor circuits 1554, a memory system 1556, a power management circuit 1560 and wireless circuits 1562 in communication with one another over a backplane 1558. IO circuits 1552 can enable other devices and systems to communicate with the device 1552, and an include any suitable interface, including a serial interface. Such communications can include instructions, configuration data, or other control inputs for enabling and/or configuring PAPR adjust circuits 1504.

Processor 1554 circuits can include one or more processors for executing instructions in memory system 1556. Memory system 1556 can provide memory for processor circuits, including instructions for execution by processor circuits 1554. Such instructions can include configuring PAPR adjust circuits 1504 in response to device state (e.g., coding scheme in place, modulation method in place, operating environment, etc.). In some embodiments, memory system 1556 can store evaluation instructions 15181 to enable processor circuits 1554 to operate as evaluation circuits for performing any of: determining an initial output signal power profile, determining if modification pulse values are to be applied and/or generating feature data for establishing pulse values. Power management circuit 1560 can control power to various portions of device 1500.

Wireless circuits 1562 can provide wireless communications compatible with one or more IEEE 802.11 wireless standards, including at least one standard that employs OFDM, including but not limited to any of: IEEE 802.11a, j, p, y, g, ac or ax. Wireless circuits can include PAPR adjust circuits 1504, MAC layer circuits 1562-0, physical layer (PHY) circuits 1562-1, radio circuits 1562-2, one or more PAs 1524 and one or more low noise amplifiers (LNAs) 1564. Wireless circuits 1562 can receive data values and related data for transmission. In some embodiments, in the event transmission includes FDM or another modulation scheme (e.g., CDMA), an output signal can be selectively modified with modification pulse values by PAPR adjust circuits 1504, as described herein or equivalents. In some embodiments, wireless circuits 1562 can include evaluation circuits 1518B which can execute evaluation operations with hardware as noted herein.

Optionally, a device 1550 can include coexistence interface (IF) circuits 1566, that can enable communication with other wireless circuits of the device 1550 (e.g., Bluetooth, Zigbee, Cellular).

In some embodiments, all circuits can be formed with a same substrate 1568. In some embodiments a device 1550 can include, or connect to, an antenna system 1546.

Figure 15B:
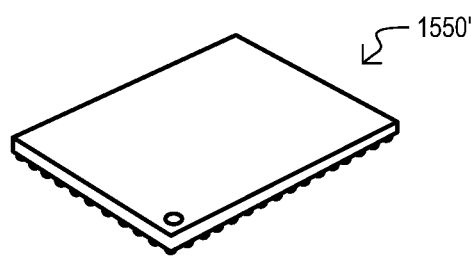

FIG. 15B is a diagram showing an integrated circuit device 1550' that can include circuits and/or execute methods as described herein and equivalents.

In this way, an integrated circuit device can apply a modification pulse to an output signal having an undesirable power profile.

While the operations of devices and systems described herein disclose various methods according to embodiments, additional methods will now be described with reference to flow diagrams.

Figure 16:
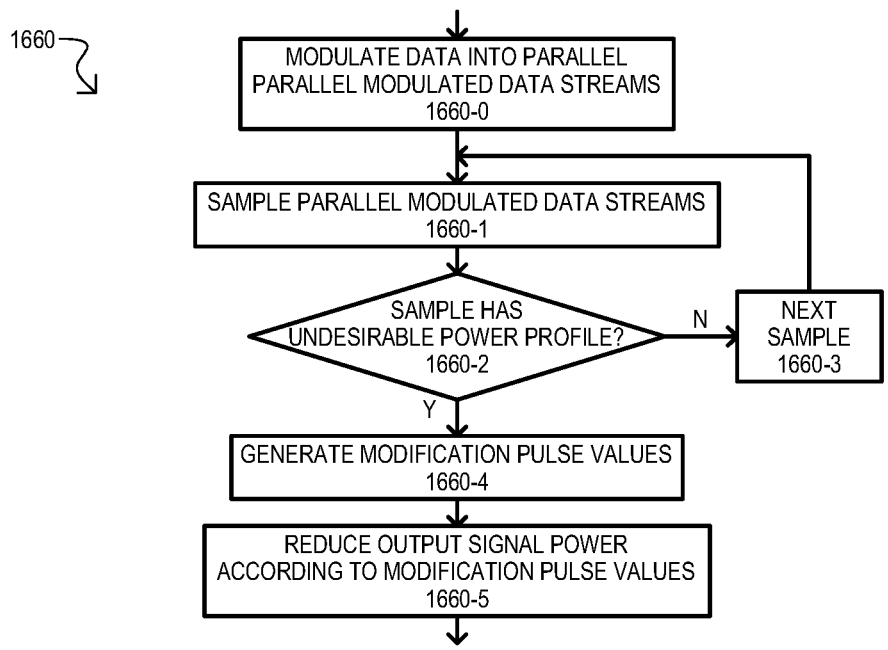
FIG. 16 is a flow diagram of a method according to an embodiment.

FIG. 16 is a flow diagram of a method 1660 according to an embodiment. A method 1660 can be executed by any suitable system of device disclosed herein, or an equivalent. A method 1660 can include modulating data into parallel modulated data streams 1660-0. Such an action can include any suitable modulation techniques, including but not limited to FDM, OFDM and CDMA. Parallel modulated data streams can be sampled 1660-1. Such an operation can include calculating, receiving or otherwise determining an output response resulting from the data streams. Such an action can include sampling values at any point along a modulation process, including but not limited to: data values prior to modulation, data values after modulation and/or an output signal resulting from modulated data values.

A determination can be made as to whether an output signal corresponding to the sampled period has an undesirable power profile 1660-2. While such an action can include determining if an output power profile meets a requirement for any suitable application, in some embodiments such an action can include determining if an output power profile is outside of a predetermined PAPR limit. If an output profile is determined to be acceptable (N from 1660-2), a method 1660 can proceed to a next sample 1660-3.

If an output profile is determined to be undesirable (Y from 1660-2), a method 1660 can generate modification pulse values 1660-4. In some embodiments, modification pulse values can follow a modification pulse shape, where such magnitudes are used to adjust output power. A modification pulse shape can be selected to provide low spectral splattering. A modification pulse shape can include, but is not limited to a Gaussian pulse, $sech^2$ pulse or sinc pulse. An output signal power can be reduced according to the modification pule values 1660-5. Such an action can include reducing output signal values in a digital fashion (e.g., prior to DAC conversion) or an analog fashion (e.g., after DAC conversion).

In this way, an undesirable power profile resulting from parallel modulated stream can be adjusted with modification values that follow a predetermined pulse shape.

Figure 17:
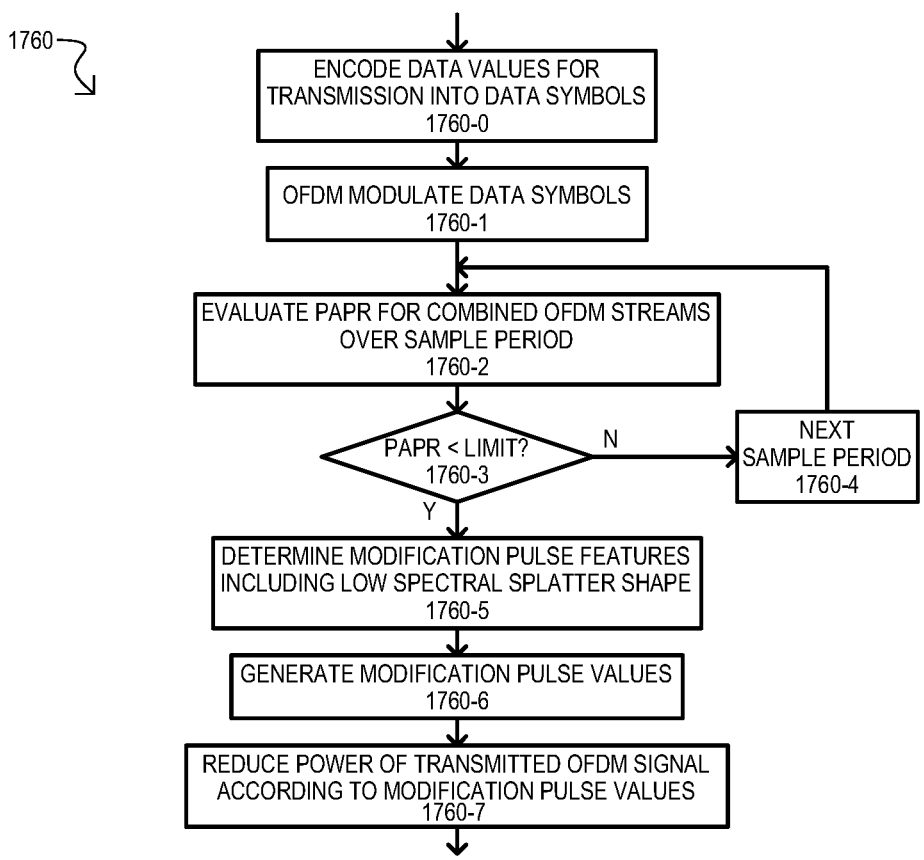
FIG. 17 is a flow diagram of a method according to another embodiment.

FIG. 17 is a flow diagram of a method 1760 according to another embodiment. A method 1760 can be executed by any suitable system of device disclosed herein, or an equivalent. A method 1760 can include encoding data values into transmission data symbols 1760-0. Such an action can include digitally encoding values in any suitable fashion to improve transmission reliability, including but not limited to: scrambling, 4/5-bit encoding and 8/10-bit encoding.

Data symbols can be modulated according to any suitable OFDM techniques 1760-1. Such actions can include modulating different data symbol streams with different orthogonal carrier frequencies, where such modulated carrier frequencies can result in transmission bandwidths that can overlap. A PAPR can be evaluated for a sample period corresponding to combined OFDM modulated values 1760-

2. Such an action can include any of those described herein or equivalents. If a PAPR is determined not to be outside of a predetermined limit (N from 1760-3), the PAPR of a next sample period can be evaluated 1760-4/2.

If a PAPR is determined to be outside the predetermined limit (Y from 1760-3), modification pulse features can be determined, including determining a low spectral splatter shape 1760-5. Such an action can include any of those described herein, including determining pulse shape, amplitude, duration or BT. In some embodiments, a modification pulse shape can have a limited frequency range. That is, a FFT of the pulse can present a bounded frequency range. In some embodiments, a pulse can have a non-linear rising and falling slope, including a rising slope that slows as it approaches a pulse peak value, and has a corresponding falling shape. In some embodiments, a pulse shape can be symmetrical in time. A modification pulse can include, but is not limited to a Gaussian pulse, $\text{sech}^2$ pulse or sinc pulse.

Modification pulse values can be generated 1760-6. Such an action can include generating signals or values correspond to the modification pulse shape.

Modification pulse values can be digital values or analog values. A power of an OFDM output signal can be reduced according to the modification pulse values 1760-7. Such an action can include any of those described herein and equivalents.

In this way, an undesirable PAPR in OFDM transmissions can have output power levels modified by a low spectral splatter modification pulse.

Embodiments are directed to methods, devices and systems that can include receiving a plurality of digital data symbols; encoding each data symbol into frequency domain values, the frequency domain values for each data symbol transmitted over a different frequency range; combining samples of multiple frequency domain values into a sequence of initial output values in time; generating a sequence of modification values that form a modification pulse, the modification pulse having a non-linear slope that decreases as it approaches a modification pulse maximum and increases as it departs from the modification pulse maximum; decreasing the initial output values according to the modification values to generate modified output values; and transmitting a wireless signal compatible with at least one IEEE wireless standard according to the modified output values.

Embodiments are directed to methods, devices and systems that can include a data encoder circuit configured to encode data values into multi-bit data symbols; a frequency encoder circuit configured to receive data symbols in parallel and encode each data symbol into frequency domain values, the frequency domain values for each data symbol being transmitted over a different frequency range; an evaluation circuit configured to generate modification pulse values in response to the data symbols; and a transmit power adjust circuit. A Transmit power adjust circuit can be configured to combine samples of multiple different frequency domain values into a sequence of initial output values in time, and decrease the initial output values according to the modification pulse values to generate modified output values. Wireless circuits can be included that are configured to transmit a wireless signal compatible with at least one IEEE 802.11 wireless standard according to the modified output values. A modification pulse can have a non-linear slope that decreases as it approaches a modification pulse maximum and increases as it departs from the modification pulse maximum.

Embodiments are directed to methods, devices and systems that can include a frequency multiplexing section that includes a frequency modulating circuit configured to frequency modulate each of a plurality of data symbols over different frequency ranges to generate a plurality of modulated signals; a radio circuit configured to transmit the modulated signals in parallel as an output signal that is compatible with at least one IEEE 802.11 wireless standard; a power modification circuit configured to reduce a transmit power of the output signal according to a modification pulse; and an antenna system configured to at least transmit the output signal. A modification pulse can have a non-linear slope that decreases as it approaches a modification pulse maximum and increases as it departs from the modification pulse maximum.

Methods devices and systems according to embodiments can include a modification pulse having the shape of a Gaussian pulse.

Methods devices and systems according to embodiments can include, in response to determining that the initial output values are outside of a predetermined peak average power ratio (PAPR) over a predetermined time period, decreasing the initial output values according to the modification values.

Methods devices and systems according to embodiments can include generating an sequence of modification values by generating selection values in response to at least the data symbols, selecting a pulse feature set from a plurality of stored pulse feature sets with the selection values, and generating the sequence of modification values according to the selected pulse feature set.

Methods devices and systems according to embodiments can include selecting a modification pulse feature by applying selection values to a look-up table.

Methods devices and systems according to embodiments can include decreasing the initial output values according to the modification values by subtracting the modified output values from the initial values to form the modified output values, and by operation of a digital-to-analog converter, converting the modified output values to an analog output signal.

Methods devices and systems according to embodiments can include decreasing the initial output values according to the modification values with a digital-to-analog converter converting the initial output values to an initial analog output signal, applying the initial analog output signal to an input of a variable gain amplifier, and modulating the gain of the variable gain amplifier according to the modification values.

Methods devices and systems according to embodiments can include an inverse fast-Fourier transform circuits as a frequency encoder circuit.

Methods devices and systems according to embodiments can include an evaluation circuit with a modification pulse store configured to store a plurality of pulse feature sets, and a modification pulse generation circuit that varies the generated modification pulse values in response to a selected pulse feature set.

Methods devices and systems according to embodiments can include an evaluation circuit with arithmetic logic circuits configured to subtract the modification pulse values from the initial output values, and a digital-to-analog converter configured to convert the modified output values into an analog signal.

Methods devices and systems according to embodiments can include an evaluation circuit with a digital-to-analog converter configured to convert the initial output values into an initial analog signal, and an amplifier having a gain modulated by the modification pulse values.

Methods devices and systems according to embodiments can include frequency modulating over different frequency ranges, where the different frequency ranges overlap one another and correspond to orthogonal carrier frequencies.

Methods devices and systems according to embodiments can include a power modification circuit evaluation circuit with a modification pulse store configured to store a plurality of pulse feature sets, and a modification pulse generation circuit that varies the generated modification pulse values in response to a selected pulse feature set.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
receiving a plurality of digital data symbols;
encoding each data symbol into frequency domain values, the frequency domain values for each data symbol transmitted over a different frequency range;
combining samples of multiple frequency domain values into a sequence of initial output values in time;
generating a sequence of modification values that form a modification pulse that includes
selecting a pulse feature set from a plurality of stored pulse feature sets with selection values, and
generating the sequence of modification values according to the selected pulse feature set, the modification pulse having a non-linear slope that decreases as it approaches a modification pulse maximum and increases as it departs from the modification pulse maximum;
decreasing the initial output values according to the modification values to generate modified output values; and
transmitting a wireless signal compatible with at least one IEEE wireless standard according to the modified output values.

2. The method of claim 1, wherein:
the modification pulse has the shape of a Gaussian pulse.

3. The method of claim 1, further including:
in response to determining that the initial output values are outside of a predetermined peak average power ratio (PAPR) over a predetermined time period, decreasing the initial output values according to the modification values.

4. The method of claim 1, further including wherein:
generating the sequence of modification values further includes
generating selection values in response to at least the data symbols.

5. The method of claim 4, wherein:
selecting the pulse feature set includes applying the selection values to a look-up table.

6. The method of claim 1, wherein:
decreasing the initial output values according to the modification values includes
subtracting the modified output values from the initial values to form the modified output values, and
by operation of a digital-to-analog converter, converting the modified output values to an analog output signal.

7. The method of claim 1, wherein:
decreasing the initial output values according to the modification values includes
by operation of a digital-to-analog converter, converting the initial output values to an initial analog output signal,
applying the initial analog output signal to an input of a variable gain amplifier, and
modulating the gain of the variable gain amplifier according to the modification values.

8. A device, comprising:
a data encoder circuit configured to encode data values into multi-bit data symbols;
a frequency encoder circuit configured to receive data symbols in parallel and encode each data symbol into frequency domain values, the frequency domain values for each data symbol being transmitted over a different frequency range;
an evaluation circuit configured to generate modification pulse values in response to the data symbols that includes
a modification pulse store configured to store a plurality of pulse feature sets, and
a modification pulse generation circuit that varies the generated modification pulse values in response to a selected pulse feature set;
a transmit power adjust circuit configured to
combine samples of multiple different frequency domain values into a sequence of initial output values in time, and
decrease the initial output values according to the modification pulse values to generate modified output values; and
wireless circuits configured to transmit a wireless signal compatible with at least one IEEE 802.11 wireless standard according to the modified output values; wherein the modification pulse has a non-linear slope that decreases as it approaches a modification pulse maximum and increases as it departs from the modification pulse maximum.

9. The device of claim 8, wherein:

the frequency encoder circuit comprises an inverse fast-Fourier transform circuit.

10. The device of claim 8, wherein:

the evaluation circuit is configured to determine a peak-average-power-ratio (PAPR) for at least a portion of the initial output values; and the transmit power adjust circuit is configured to decrease the initial output values in response to the PAPR being outside of a predetermined limit.

11. The device of claim 8, wherein:

the evaluation circuit includes
- arithmetic logic circuits configured to subtract the modification pulse values from the initial output values, and
- a digital-to-analog converter configured to convert the modified output values into an analog signal.

12. The device of claim 8, wherein:

the evaluation circuit includes
- a digital-to-analog converter configured to convert the initial output values into an initial analog signal, and
- an amplifier having a gain modulated by the modification pulse values.

13. The device of claim 8, wherein:

the modification pulse has the shape of a Gaussian pulse.

14. A system, comprising:

a frequency multiplexing section that includes
- a frequency modulating circuit configured to frequency modulate each of a plurality of data symbols over different frequency ranges to generate a plurality of modulated signals;
- a radio circuit configured to transmit the modulated signals in parallel as an output signal that is compatible with at least one IEEE 802.11 wireless standard;

a power modification circuit configured to reduce a transmit power of the output signal according to a modification pulse that includes
- a modification pulse store configured to store a plurality of pulse feature sets, and
- a modification pulse generation circuit that varies the generated modification pulse values in response to a selected pulse feature set; and an antenna system configured to at least transmit the output signal; wherein the modification pulse has a non-linear slope that decreases as it approaches a modification pulse maximum and increases as it departs from the modification pulse maximum.

15. The system of claim 14, wherein:

the power modification circuit is configured to
- determine a peak-average-power-ratio (PAPR) for at least a portion of the modulated signals, and
- reduce the transmit power in response to the PAPR being outside of a predetermined limit.

16. The system of claim 14, wherein:

the different frequency ranges overlap one another and correspond to orthogonal carrier frequencies.

17. The system of claim 14, wherein:

the modification pulse comprises a Gaussian pulse.

* * * * *